US006275934B1

(12) United States Patent
Novicov et al.

(10) Patent No.: US 6,275,934 B1
(45) Date of Patent: Aug. 14, 2001

(54) AUTHENTICATION FOR INFORMATION EXCHANGE OVER A COMMUNICATION NETWORK

(75) Inventors: Aleksey Novicov; John Michael Rivlin, both of Palo Alto; Garth Conboy, La Jolla; James Sachs, Menlo Park, all of CA (US)

(73) Assignee: Soft Book Press, Inc., Menlo Park, CA (US)

( * ) Notice: Subject to any disclaimer, the term of this patent is extended or adjusted under 35 U.S.C. 154(b) by 0 days.

(21) Appl. No.: 09/173,970

(22) Filed: Oct. 16, 1998

(51) Int. Cl.[7] ............................................... H04L 9/00

(52) U.S. Cl. ............................................... 713/168

(58) Field of Search ............................................... 713/168

(56) References Cited

U.S. PATENT DOCUMENTS

| D. 276,626 | 12/1984 | Lockwood . |
| D. 289,777 | 5/1987 | Thomas . |

(List continued on next page.)

FOREIGN PATENT DOCUMENTS

| 0 390 611 | 3/1990 | (EP) . |
| 2 657 451 | 1/1990 | (FR) . |
| 2 657 187 | 7/1991 | (FR) . |
| 2 149 544 | 6/1995 | (GB) . |
| WO 87/01481 | 3/1987 | (WO) . |
| WO 89/05023 | 6/1989 | (WO) . |
| WO 97/20274 | 6/1997 | (WO) . |
| WO 98 40809 | 9/1998 | (WO) . |
| WO9840809 * | 10/1998 | (WO) ................................. 713/168 |

OTHER PUBLICATIONS

Gustavus Simmons, Comtemporary Cryptology, chapter, 1992.*
Bruce Schneier, Applied Cryptography, section 3.2, 1992.*
Dvorak, et al. Methodology for User Centred Link Structures for Textbook to Hypertext Conversion, IEEE, Jan. 1992, pp. 619–628.
Pobiak Adjustable Access Electronic Books, IEEE, Jan. 1992, pp. 90–94.
Ramos Making Book on Electronic Books, College Store Journal—Sep./Oct. 1992.
Cox Technology Threatens to Shatter the World of College Textbooks The Wall Street Journal—Electronic Campus, Jun. 1, 1993.
Wantanabe et al., Visual Interface for Retrieval of Electronic–Formed Books, IEEE, Jul. 1993, pp. 692–695.
The Heller Report, Oct. 1993.
Ziegler IBM to Unveil Plan to Skip Disks, Send Software by Satellite, The Wall Street Journal, Nov. 1, 1994.
Fisher This Little Compute rTries to be a Book, St. Louis Post–Dispatch, Jan. 4, 1995.
Steinert–Threlkeld Now, Data by Satellite, Inter@ctive Week (no date).

* cited by examiner

Primary Examiner—Gail Hayes
Assistant Examiner—James Seal
(74) Attorney, Agent, or Firm—Townsend and Townsend and Crew LLP

(57) ABSTRACT

The present invention is a method and apparatus for authenticating an information exchange between a host and a guest on a network. The host has a host key and the guest has a guest key. An authenticating server authenticates the guest. The authenticating server uses the host key and the guest key. The guest authenticates the authenticating server using the guest key. The host authenticates the guest and the authenticating server using the host key.

20 Claims, 8 Drawing Sheets

U.S. PATENT DOCUMENTS

| | | | |
|---|---|---|---|
| D. 330,544 | * | 10/1992 | Kane . |
| D. 339,329 | | 9/1993 | Lacko . |
| D. 346,620 | | 5/1994 | McSorely . |
| D. 359,306 | | 6/1995 | Lande et al. . |
| D. 362,271 | | 9/1995 | Luong . |
| D. 362,272 | | 9/1995 | Luong . |
| D. 362,461 | | 9/1995 | Luong . |
| 3,718,906 | | 2/1973 | Lightner . |
| 4,159,417 | | 6/1979 | Rubincam . |
| 4,490,810 | | 12/1984 | Hon . |
| 4,545,023 | | 10/1985 | Mizzi . |
| 4,575,621 | | 3/1986 | Dreifus . |
| 4,591,974 | | 5/1986 | Dornbush et al. . |
| 4,597,058 | | 6/1986 | Izumi et al. . |
| 4,601,011 | | 7/1986 | Grynberg . |
| 4,649,499 | | 3/1987 | Sutton et al. . |
| 4,682,161 | | 7/1987 | Bugg . |
| 4,725,977 | | 2/1988 | Izumi et al. . |
| 4,779,080 | | 10/1988 | Coughlin et al. . |
| 4,820,167 | | 4/1989 | Nobles et al. . |
| 4,855,725 | | 8/1989 | Fernandez . |
| 4,899,292 | | 2/1990 | Montagna et al. . |
| 4,916,441 | | 4/1990 | Gombrich . |
| 4,918,632 | | 4/1990 | York . |
| 4,972,496 | | 11/1990 | Sklarew . |
| 4,985,697 | * | 1/1991 | Boulton . |
| 5,021,989 | * | 6/1991 | Fujisawa et al. . |
| 5,025,373 | * | 6/1991 | Keyser, Jr. et al. . |
| 5,031,119 | * | 7/1991 | Dulaney et al. . |
| 5,065,345 | * | 11/1991 | Knowles et al. . |
| 5,091,939 | * | 2/1992 | Cole et al. . |
| 5,109,354 | * | 4/1992 | Yamashita et al. . |
| 5,115,508 | * | 5/1992 | Hatta . |
| 5,121,492 | * | 6/1992 | Saville, III et al. . |
| 5,133,076 | * | 7/1992 | Hawkins et al. . |
| 5,146,552 | * | 9/1992 | Cassorla et al. . |
| 5,157,491 | * | 10/1992 | Kassatly . |
| 5,157,737 | * | 10/1992 | Sklarew . |
| 5,157,783 | * | 10/1992 | Anderson et al. . |
| 5,199,104 | * | 3/1993 | Hirayama . |
| 5,203,001 | * | 4/1993 | Yanagiuchi et al. . |
| 5,214,696 | * | 5/1993 | Keiser, II et al. . |
| 5,221,838 | * | 6/1993 | Gutman et al. . |
| 5,222,136 | * | 6/1993 | Rasmussen et al. . |
| 5,226,080 | | 7/1993 | Cole et al. . |
| 5,231,662 | | 7/1993 | van Rumpt et al. . |
| 5,233,333 | | 8/1993 | Borsuk . |
| 5,239,665 | | 8/1993 | Tsuchiya . |
| 5,245,656 | | 9/1993 | Loeb et al. . |
| 5,247,661 | | 9/1993 | Hager et al. . |
| 5,253,294 | | 10/1993 | Maurer . |
| 5,319,582 | | 6/1994 | Ma . |
| 5,333,116 | | 7/1994 | Hawkins et al. . |
| 5,339,091 | | 8/1994 | Yamazaki et al. . |
| 5,359,707 | | 10/1994 | Sato . |
| 5,365,598 | | 11/1994 | Sklarew . |
| 5,367,621 | | 11/1994 | Cohen et al. . |
| 5,379,057 | | 1/1995 | Clough et al. . |
| 5,388,196 | | 2/1995 | Pajak et al. . |
| 5,392,387 | | 2/1995 | Fitzpatrick et al. . |
| 5,398,310 | | 3/1995 | Tchao et al. . |
| 5,404,505 | | 4/1995 | Levinson . |
| 5,428,606 | | 6/1995 | Moskowitz . |
| 5,438,344 | | 8/1995 | Oliva . |
| 5,457,746 | | 10/1995 | Dolphin . |
| 5,463,725 | | 10/1995 | Henckel et al. . |
| 5,465,213 | | 11/1995 | Ross . |
| 5,467,102 | | 11/1995 | Kuno et al. . |
| 5,475,399 | | 12/1995 | Borsuk . |
| 5,477,510 | | 12/1995 | Ukita . |
| 5,483,586 | | 1/1996 | Sussman . |
| 5,598,470 | | 1/1997 | Cooper et al. . |
| 5,615,264 | | 3/1997 | Kazmierczak et al. . |
| 5,629,980 | | 5/1997 | Stefik et al. . |
| 5,638,443 | | 6/1997 | Stefik et al. . |
| 5,684,950 | | 11/1997 | Dare et al. ...................... 395/187.01 |
| 5,697,793 | | 12/1997 | Huffman et al. . |
| 5,719,943 | | 2/1998 | Amada et al. . |
| 5,734,823 | | 3/1998 | Saigh et al. . |
| 5,734,891 | | 3/1998 | Saigh . |
| 5,784,463 | | 7/1998 | Chen et al. ........................... 380/21 |

```
<A HREF = "saleapproved.asp?arg1=xxx&arg2=yyy...&argN="
[TY?E = {message | secure}]
[SHOWSLIP]
[PROMPT = "Do you approve the sales transaction of $33.94?"]
[YESBUTTON = "Yes"]
[NOBUTTON = "No"]
[NOHREF = "salecancelled.asp?arg1=xxx&arg2=yyy...&argN=zzz"]>
optional text </A>
```

Fig. 5

```
<FORM SECURE ACTION = "/register/detail.asp" METHOD = "GET">
    Please verify your personal information:
    <BR><INPUT TYPE = "TEXT" NAME = "Name" VALUE = "Aleksey Novicov">
    <BR><INPUT TYPE = "TEXT" NAME = "Date" VALUE = "2/99">
    <BR>
    <BR><INPUT TYPE = "SUBMIT" VALUE = "Register">
</FORM>
```

Fig. 6

AUTHENTICATION FOR INFORMATION EXCHANGE OVER A COMMUNICATION NETWORK

BACKGROUND

1. Field of the Invention

This invention relates to computer security. In particular, the invention relates to authentication for information exchange.

2. Description of Related Art

The rapid growth of computer and communication technologies has facilitated business transactions in a number of ways. One particular area of business transactions in the electronic commerce. Consumers can now conduct commercial transactions with business entities conveniently and efficiently over the communication networks such as the Internet.

A major problem in electronic commerce is security. Consumers want to securely access remote sites on the Internet without disclosing their identities or activities. Business entities want to keep their transactions secret from others to increase consumers's trust and to protect their own business information and trade secrets. The key aspects of communication security include confidentiality and information integrity. An individual user wants to be assured that he or she is dealing with a trusted business entity to keep his or her activities private. A business entity also wants to be assured that it is conducting business with a genuine customer and not some impostor. The process to ensure that the two parties who are doing business with each other are two true and genuine parties is called authentication.

A simple way to authenticate a party is to use a user identification code and a password. Although the use of a user ID and a password is sufficient for simple transactions, they are inadequate for more complex commercial transactions. When a user ID or a password is transmitted in the clear over a communication network, there is a high possibility that the information can be intercepted by illegal users.

Therefore there is a need in the technology to provide a reliable and efficient method to authenticate parties involved in an information exchange over a communication network.

SUMMARY

The present invention is a method and apparatus for authenticating an information exchange between a host and a guest on a network. The host has a host key and the guest has a guest key. An authenticating server authenticates the guest. The authenticating server uses the host key and the guest key. The guest authenticates the authenticating server using the guest key. The host authenticates the guest and the authenticating server using the host key.

BRIEF DESCRIPTION OF THE DRAWINGS

The features and advantages of the present invention will become apparent from the following detailed description of the present invention in which:

FIG. 5 is a diagram illustrating the use of extended anchor tags to approve a sales transaction according to one embodiment of the invention.

FIG. 6 is a diagram illustrating the use of a SECURE attribute for information submission according to one embodiment of the invention.

DESCRIPTION

The present invention is a method and apparatus for authenticating parties in an information exchange over a communication network. The method uses an authentication server as an intermediary between a host and a guest. The entire authentication procedure involves a number of authenticating processes between the three communicating entities. Each party sends encrypted information using a secret key. The encrypted information is decrypted by the recipient and the decrypted information is matched with a predetermined code. The authentication is successful when there is a match between the decrypted information and the predetermined code.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Figure 1:
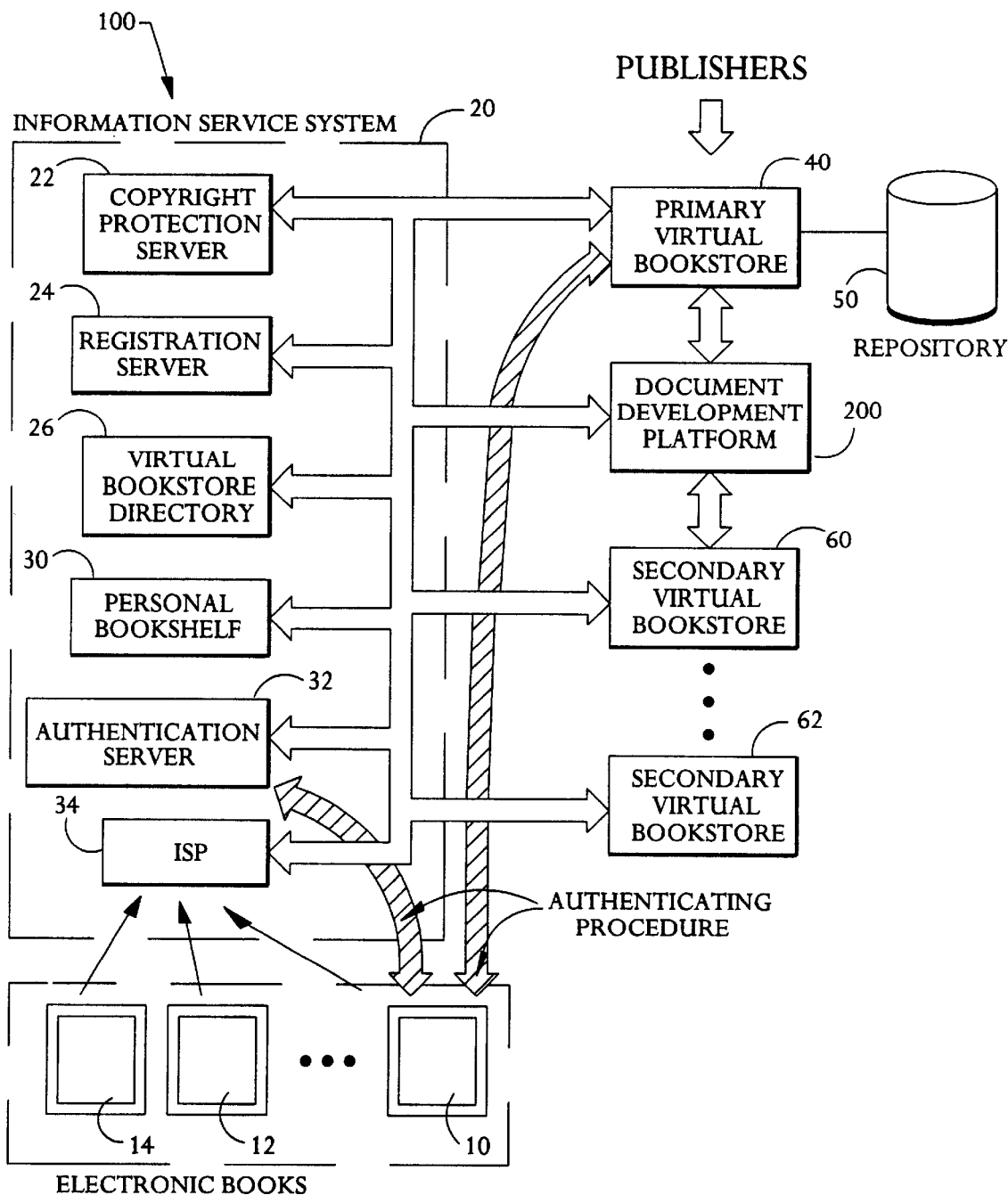
FIG. 1 is a diagram illustrating a system in which one embodiment of the invention can be practiced.

FIG. 1 is a diagram illustrating a system in which one embodiment of the invention can be practiced.

Referring to FIG. 1, the system 100 comprises: (a) at least one portable electronic book 10 operative to request a digital content from a catalog of distinct digital contents, to receive and display the requested digital content in readable form; (b) an information services system 20 which includes an authentication server 32 for authenticating the identity of the requesting portable electronic book 10 and a copyright protection server 22 for rendering the requested digital content sent to the requesting portable electronic book 10 readable only by the requesting portable electronic book 10; (c) at least one primary virtual bookstore 40 in electrical communication with the information services system 20, the primary virtual bookstore being a computer-based storefront accessible by the portable electronic book and including the catalog of distinct digital contents; (d) a repository 50, in electrical communication with the primary virtual bookstore 40, for storing the distinct digital contents listed in the catalog; and (e) an authentication server 32 for authenticating the electronic book users or a bookstore in an information exchange with a host.

The system 100 preferably includes more than one portable electronic book 10, to be commercially viable. This is illustrated in FIG. 1 by including the portable electronic books 12 and 14. The system also preferably includes more than one primary virtual bookstore 40, each serving a different set of customers, each customer owning a portable electronic book.

In one embodiment of the invention, the system 100 further comprises a secondary virtual bookstore 60 in electrical communication with the information services system 20. In this case, the information services system 20 also includes a directory of virtual bookstores 26 in order to provide the portable electronic book 10 with access to the secondary virtual bookstore 60 and its catalog of digital contents.

The information services system 20 also includes a registration server 24 for keeping track of the portable electronic books that are considered active accounts in the system and for ensuring that each portable electronic book is associated with a primary virtual bookstore in the system.

The information services system 20 preferably comprises a centralized bookshelf 30 associated with each portable electronic book 10 in the system. Each centralized bookshelf 30 contains all digital contents requested and owned by the associated portable electronic book 10. Each portable electronic book 10 user can permanently delete any of the owned digital contents from the associated centralized bookshelf 30. Since the centralized bookshelf 30 contains all the digital contents owned by the associated portable electronic book 10, these digital contents may have originated from different virtual bookstores. The centralized bookshelf 30 is a storage extension for the portable electronic book 10. Such storage extension is needed since the portable electronic book 10 has limited non-volatile memory capacity.

The user of the portable electronic book 10 can add marks, such as bookmarks, inking, highlighting and underlining, and annotations on a digital content displayed on the screen of the portable electronic book, then stores this marked digital content in the non-volatile memory of the electronic book 10. The user can also upload this marked digital content to the information services system 20 to store it in the centralized bookshelf 30 associated with the portable electronic book 10, for later retrieval. It is noted that there is no need to upload any unmarked digital content, since it was already stored in the centralized bookshelf 30 at the time it was first requested by the portable electronic book 10.

The information services system 20 further includes an Internet Services Provider (ISP) 34 for providing Internet network access to each portable electronic book in the system.

FIG. 1 further illustrates that the electronic book 10 interacts with the authenticating server 32 and the primary virtual bookstore 40 for authentication of information exchange. In this scenario, the electronic book 10 is a guest and the primary virtual bookstore is a host. The authentication is carried out over the communication network provided by the ISP 34. As will be explained later, other combinations of guest/host are possible.

Figure 2:
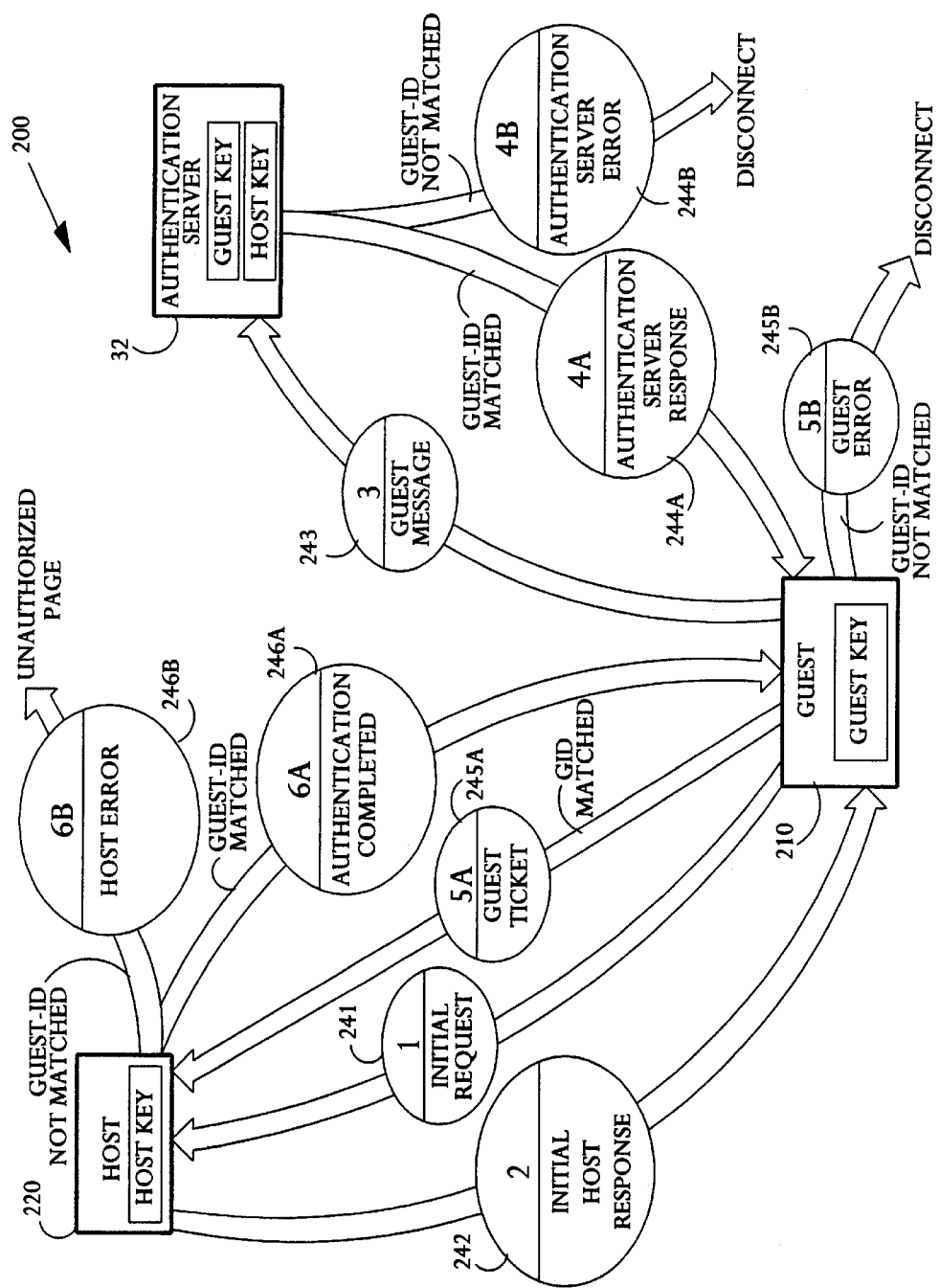
FIG. 2 is a diagram illustrating an authentication procedure according to one embodiment of the invention.

FIG. 2 is a diagram illustrating an authentication procedure 200 according to one embodiment of the invention.

The authentication procedure 200 involves a guest 210, a host 220, an authentication server 32, an initial request path 241, an initial host response path 242, a guest message path 243, an authentication server response path 244A, a authentication server error path 244B, a guest ticket path 245A, a guest error path 245B, an authentication completed path 246A, and a host error path 256B.

The guest 210 represents the party who initiates the information exchange. The host 220 represents the party who responds to the access request by the guest 210. When an electronic book accesses a bookstore, the personal library, or the registration server (FIG. 1), the electronic book is the guest and the bookstore, the library, or the registration server is the host. When the bookstore accesses the personal library, the bookstore is the guest and the library is the host. As is known by one skilled in the art, other guest/host combinations can be accommodated using the authentication procedure of the present invention. The authentication server 32 is an intermediary agent or entity acting on behalf of the host 220 to authenticate the guest 210.

The authentication procedure 200 uses a symmetric key encryption algorithm to generate a session key that is used during the session. The guest 210 keeps a secret key that is known only to the guest 210 and the authentication server 32. When the guest 210 is the electronic book, the secret key is programmed into the electronic book during the manufacturing process. When the guest 210 is a bookstore, the secret key is created by the bookstore manager or provided by the information service.

The initial request path 241 goes from the guest 210 to the host 220. The initial request path 241 corresponds to the first step (Step 1) in the authentication procedure and is established when the guest 210 initiates the request for a session to the host 220. The guest 210 sends a GET request to the host together with any additional parameters normally required by the host 220.

The initial host response path 242 goes from the host 220 to the guest 210. The initial host response path 242 corresponds to the second step (Step 2) in the authentication procedure and is established when the host 220 responds to the initial request from the guest 210 via the initial request path 241. The host 220 responds with the new URL pointing to the authentication server 32 and appends HOST_ID and HOST_URL parameters to the query string. The host 220 also returns with an AUTHENTICATION=YES cookie to the guest 210 to indicate to the guest 210 the need to generate authentication parameters on the redirection to the authentication server 32.

The guest message path 243 goes from the guest 210 to the authentication server 32. The guest message path 243 corresponds to the third step (Step 3) in the authentication procedure and is established when the guest 210 responds to the AUTHENTICATION=YES cookie returned by the host via the initial host response path 242. The guest 210 creates a MESSAGE and append a number of parameters.

The MESSAGE includes 64 ASCII hexadecimal characters and is formed by two parts. The first part is the represented by the expression GKEY(SKEY, TIME), and the second part is represented by the expression TKEY(GID, CID). The GKEY(SKEY, TIME) includes 32 ASCII hexadecimal characters and is formed by encrypting an SKEY and a TIME. The SKEY is an 8-byte random number generated by the guest 210. TIME is a 4-byte number representing the current time in seconds based on an epoch of 1/1/1904 (4 bytes). The SKEY and TIME are encrypted using the guest key (GKEY). This allows the authentication server 32 to authenticate the guest 210 for a limited time period by accepting time value within a predefined time range. In one embodiment, this predefined time range is 2 hours. The TKEY(GID, 0) includes 32 ASCII hexadecimal characters and is formed by encrypting a GID and a CID. The GID is a 12-character guest ID (e.g., the electronic book ID or the bookstore ID). The CID is a 4-byte customer ID. The GID and CID are encrypted together using a temporary key (TKEY). The TKEY is formed by the first eight bytes of the MD5 digest of a data key (DKEY). The DKEY is formed by the first eight bytes of the MD5 digest of the SKEY.

The appended parameters include other pertinent information such as HOST_ID, HOST_URL, GUEST_ID, DEVICE_TYPE, and VERSION. The HOST_ID is the host identification represented by ASCII number. The HOST_URL is the encoded URL to return to the host. The GUEST_ID is the electronic book serial number or the bookstore ID. The DEVICE_TYPE is the guest type (e.g., electronic book or bookstore). The VERSION is the protocol version number.

The authentication server response path 244A goes from the authentication server 32 to the guest 210. The authentication server response path 244A corresponds to the fourth step (Step 4) in the authentication procedure and is established when the authentication server 32 responds to the MESSAGE sent by the guest 210 via the guest message path 243.

The authenticating server 32 looks up the secret key for the given device type and decrypts the MESSAGE. If the decrypted GID matches the GUEST_ID sent in the appended parameters in the clear as part of the URL, the guest 210 is authenticated and the authentication server response path 244A is established. If the decrypted GID does not match the GUEST_ID, the authentication server error path 244B is established which is described later.

The time portion of the authentication is checked. If it is within a reasonable tolerance (e.g., within the predetermined time range), the authentication server 32 returns an URL redirection to the host, an encrypted RESPONSE cookie, and appends a number of parameters to be described later. If the time portion is outside a reasonable tolerance, the authenticating server 32 responds with an URL redirection to itself specifying two cookies to allow the guest 210 the opportunity to reset its clock properly. The two cookies returned by the authentication server 32 are AUTHENTICATE=YES and TIME=n. The appended parameters include GUEST_ID, DEVICE_TYPE, VERSION, CUSTOMER_ID, FIRST_NAME, MIDDLE_NAME, LAST_NAME, COMPANY, STREET1, STREET2, CITY, STATE, COUNTRY, ZIP, and PRIMARY. The GUEST_ID is the electronic book serial number or the bookstore ID. The DEVICE_TYPE is the guest type (e.g., electronic book or bookstore). The VERSION is the protocol version number. The CUSTOMER_ID is a numeric string representing the electronic book customer identification number. The FIRST_NAME, MIDDLE_NAME, and LAST_NAME represent the name of the customer and is retrieved from the registration database. The COMPANY is the customer's affiliation and is retrieved from the registration database. The STREET1, STREET2, CITY, STATE, COUNTRY, ZIP represent the customer's address and are retrieved from the registration database. The PRIMARY is a flag or indicator (e.g., TRUE or FALSE) to indicate if the bookstore is a primary bookstore or a secondary bookstore.

The RESPONSE includes a 64 ASCII hexadecimal characters which are converted from an encrypted code using the TKEY represented by the expression TKEY(HKEY(SKEY, TIME), TKEY(GID, CID)). HKEY is the host key.

The authentication server error path 244B goes from the authentication server 32 to an error facility. The authentication server path 244B is established when the decrypted GID does not match the GUEST_ID sent in the appended parameters in the clear as part of the URL. The authentication server 32 returns an HTML that displays an error message. An example of such an error message is: "Your electronic book may be defective. Please try again in a few minutes, or contact the manufacturer at the phone number listed in your product manual".

The guest ticket path 245A goes from the guest 210 to the host 220. The guest ticket path 245A corresponds to the fifth step (Step 5) in the authentication procedure and is established when the guest 210 responds to the RESPONSE from the authenticating server 32 sent by the authentication server 32 via the authenticating server response path 244A.

The guest 210 decrypts the RESPONSE cookie to verify if the authenticating server 32 is in fact genuine by matching the decrypted GID with its own serial number or its own ID. If the authentication server is deemed to be genuine, the 32 byte (or 64 ASCII hexadecimal characters) RESPONSE is decrypted using the TKEY, which is derived from the SKEY. The guest 210 then generates a TICKET which is a 64 ASCII hexadecimal character string converted from the 32-byte RESPONSE. The TICKET is appended to the parameter list of the URL and the redirection to the host 220 is completed. The parameter list includes the same parameters sent via the authentication server response path 244A.

The guest error path 245B goes from the guest 210 to an error processing facility. The guest error path 245B corresponds to the fifth step (Step 5) in the authentication procedure and is established when the decrypted GID does not match with the guest own serial number or its own ID.

The authentication completed path 246A goes from the host 220 to the guest 210. The authentication completed path 246A corresponds to the sixth step (Step 6) in the authentication procedure and is established when the host 220 responds to the TICKET sent from the guest 210 via the guest ticket path 245A.

The host 220 decrypts the TICKET received from the guest 210 via the guest ticket path 245A. If the decrypted GID matches the GUEST)ID sent in the clear, the authentication server 32 and the guest 210 are deemed genuine and the authentication procedure is completed.

Figure 3A:
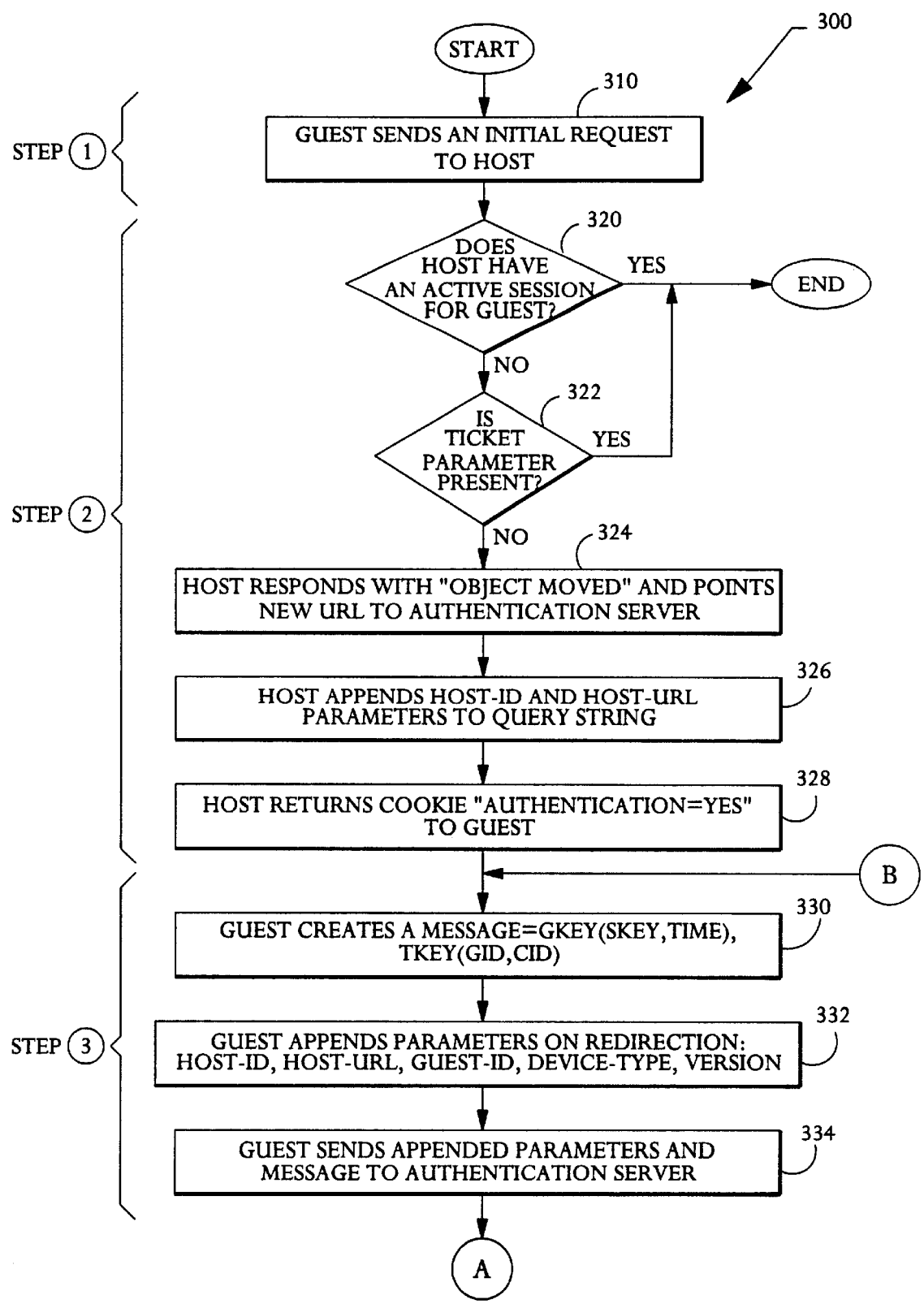
FIG. 3A is a flowchart illustrating a process to perform the first three steps in the authentication procedure in FIG. 2 according to one embodiment of the invention.

The host error path 256B goes from the host to an error processing facility. The host error path 246B corresponds to the sixth step (Step 6) in the authentication procedure and is established when the decrypted GID does not match the GUEST_ID sent in the clear. If this occurs, either the authentication server 32 is not trusted or the guest 210 is not trusted. The host 220 then redirects the GET back to the authentication server 32 to the unauthorized page to process the error. If the guest 210 is a new user and the host 220 does not accept guest access, the host 220 can redirect the GET back to the authentication server 32 to the unauthorized page to process the error FIG. 3A is a flowchart illustrating a process 300A to perform the first three steps in the authentication procedure in FIG. 2 according to one embodiment of the invention. The process 300A corresponds to steps 1, 2, and 3 in the authentication procedure.

Upon START, the process 300A performs step 1. The guest sends an initial request to the host (Block 310). Step 1 is completed. Then the process 300A performs step 2 by first determining if the host has an active session for the guest at the time (Block 320). If there is an active session signifying that an authentication has been performed, the process 300A is terminated. If not, the host determines if the TICKET parameter is present (Block 322). If the TICKET parameter is present signifying that the host is performing authentication, the process 300A is terminated. If the TICKET parameter is not present, the host responds to the guest request with "object moved" and points new URL to the authentication server (Block 324). Then the host appends the HOST_ID and HOST_URL parameters to the query string (Block 326). Then the host returns the AUTHENTICATE=YES cookie to the guest (Block 328). Step 2 is completed.

The process 300A performs step 3 at the connector B. The guest creates a MESSAGE based on the expression GKEY (SKEY, TIME), TKEY(GID, CID) (Block 330). Then the guest appends parameters on redirection: HOST_ID, HOST_URL, GUEST_ID, DEVICE_TYPE, and VERSION (Block 332). Then the guest sends MESSAGE and the appended parameters to the authentication server (Block 334). Step 3 is completed, concluding the process 300A at the connector A.

Figure 3B:
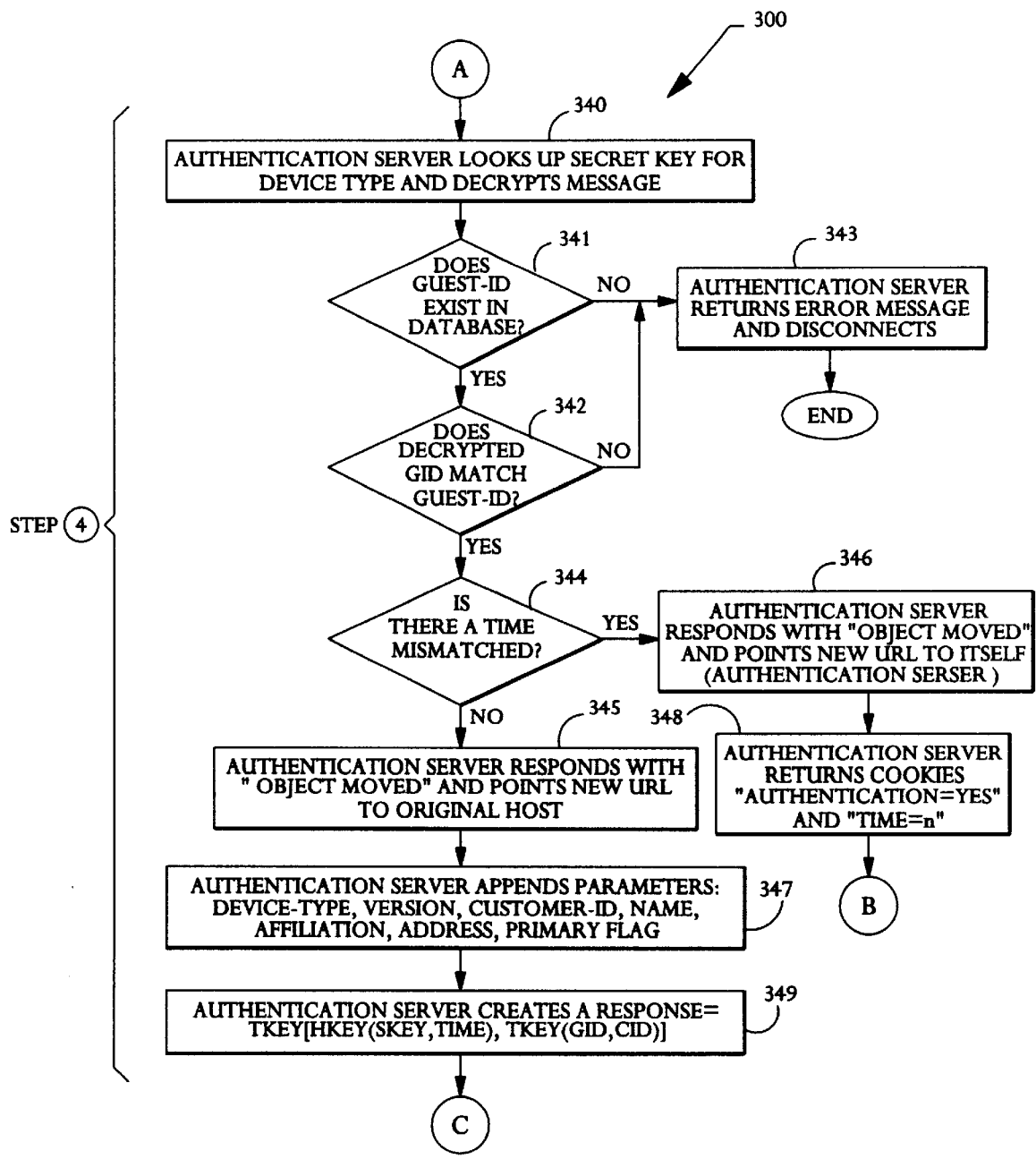
FIG. 3B is a flowchart illustrating a process to perform the fourth step in the authentication procedure in FIG. 2 according to one embodiment of the invention.

FIG. 3B is a flowchart illustrating a process 300B to perform the fourth step in the authentication procedure in FIG. 2 according to one embodiment of the invention. The process 300B corresponds to step 4 in the authentication procedure.

The process 300B starts step 4 at the connector A. The authentication server looks up the secret key for the device type received from the guest and decrypts the message (Block 340). Then the process 300B determines if the guest ID exist in the database (Block 341). If not, the authentication server returns an error message and disconnects the connection (Block 343) and is then terminated. If the guest ID exists in the database, the authentication server determines if the decrypted GID match the GUEST_ID parameter received in the clear (Block 342). If not, the authentication server returns an error message and disconnects the connection (Block 343) and is then terminated. If the decrypted GID matches the GUEST_ID parameter, the authentication server determines if there is a time mismatch (Block 344). If there is a time mismatch, the authentication server responds to the guest with "object moved" and points new URL to itself (Block 346). The authentication server returns two cookies AUTHENTICATION=YES and TIME=n to the guest (Block 348) and then returns to connector B at Block 330 (FIG. 3A).

If there is no time mismatch, the authentication server responds to the guest with "object moved" and points new URL to the original host (Block 345). Then the authentication server appends the list of parameters: guest ID, device type, version, customer ID, name, affiliation, address, primary flag (Block 347). Next, the authentication server creates a response based on the expression TKEY(HKEY (SKEY, TIME), TKEY(GID, CID)) (Block 349). The process 300B concludes step 4 and proceeds to connector C.

Figure 3C:
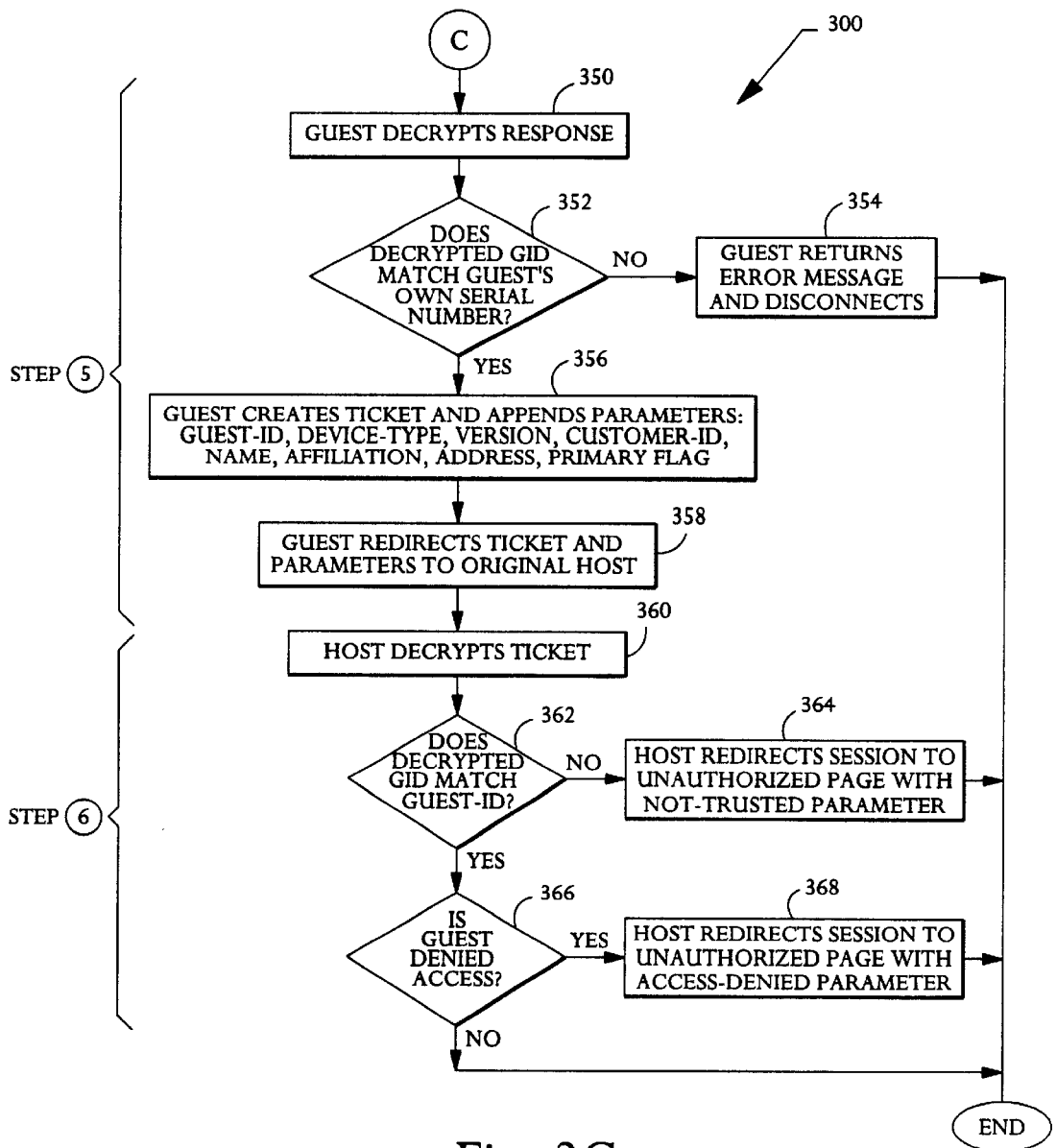
FIG. 3C is a flowchart illustrating a process to perform the last two steps of the authentication procedure in FIG. 2 according to one embodiment of the invention.

FIG. 3C is a flowchart illustrating a process 300C to perform the last two steps of the authentication procedure in FIG. 2 according to one embodiment of the invention. The process 300C corresponds to steps 5 and 6 in the authentication procedure.

The process 300C starts step 5 at the connector C. The guest decrypts the response from the authentication server (Block 350). Then the guest determines if the decrypted GID match the guest's own serial number (block 352). If not, the guest returns an error message and disconnects (Block 354). The process 300C is then terminated. If the decrypted GID match the guest's own serial number, the guest creates the ticket by decrypting the response and converting it back. The guest then appends the list of parameters: guest ID, device type, version, customer ID, name, affiliation, address, primary flag (Block 356). Then the guest redirects the ticket and the appended parameters to the original host (Block 359). Step 5 is completed.

The process 300C starts step 6 where the host receives the ticket and parameters from the guest. The host decrypts the encrypted ticket (Block 360). Then the host determines if the decrypted GID match the guest ID sent in the clear (Block 362). If not, the host redirects the session to the unauthorized page with a NOT_TRUSTED parameter (Block 364) and the authentication procedure is terminated. If there is a match, the host determines if the guest is denied access (Block 366). If yes, the host redirects the session to an unauthorized page with an ACCESS DENIED parameter (Block 368) and the authentication procedure is terminated. If the guest access is not denied, the guest is deemed genuine and the authentication procedure is completed.

If the host cannot trust the response from the guest or Authentication server, it redirects the session to the unauthorized page with the "why" parameter set to "ELECTRONIC_BOOK_NOT_TRUSTED".

http://authenticate.electronicbook.net/authenticate/unauthorized.asp?
GUEST_ID=deviceID&HOST_ID=storeID&WHY=ELECTRONIC_BOOK_NOT_TRUSTED If a particular guest is denied access to a host, even though it successfully authenticated, it redirects the session to the unauthorized page with the "WHY" parameter set to "ACCESS_DENIED".

http://authenticate.bookserver.com/authenticate/unauthorized.asp?
GUEST_ID=deviceID&HOST_ID=storeID&HOST_URL=previousHost & WHY=ACCESS_DENIED The process 300C is then terminated.

During the authentication process, if it is discovered that the programmable read only memory (ROM) in the electronic book needs to be updated, the user will be asked if ROM updating is desired.

Figure 4:
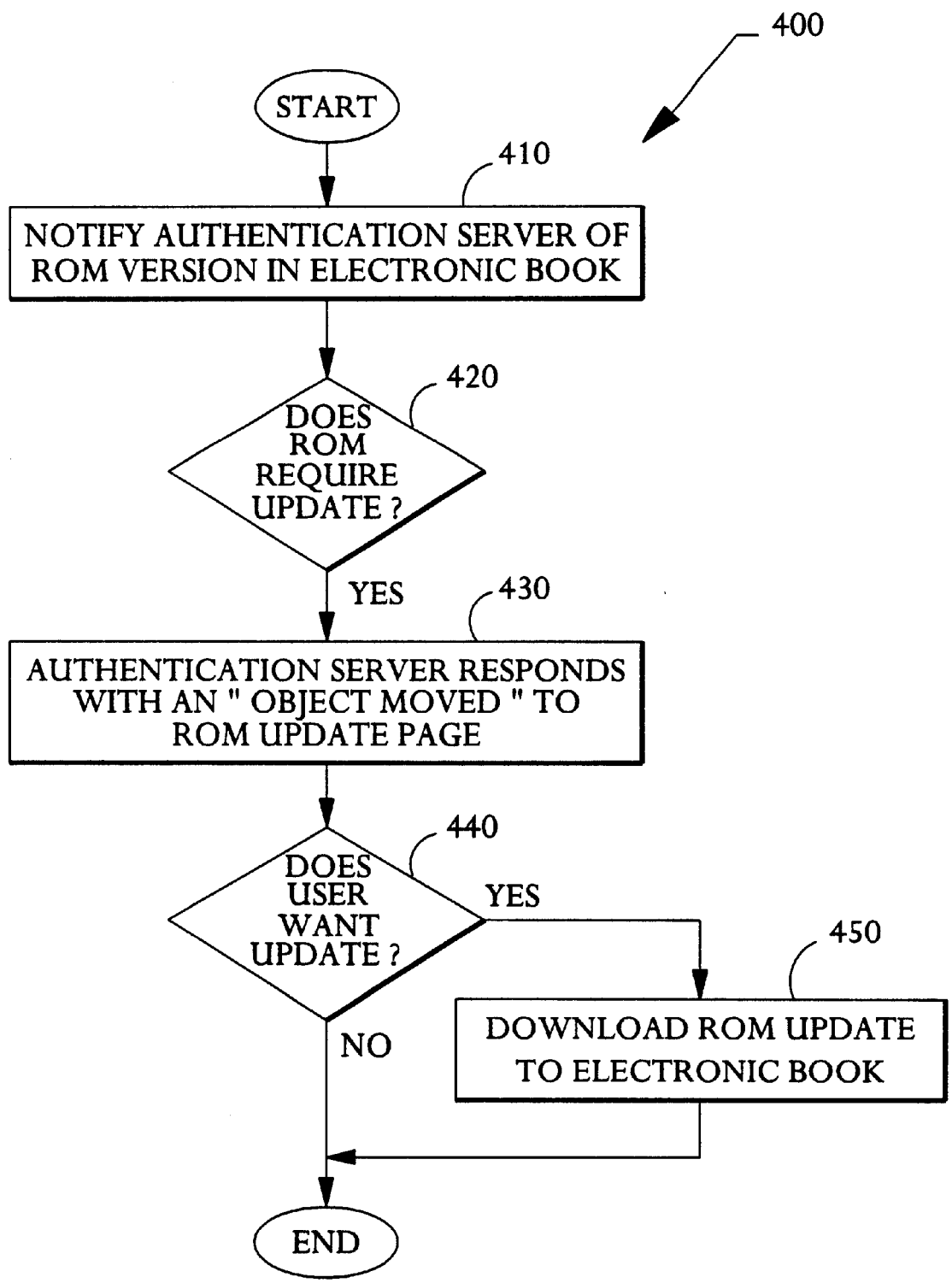
FIG. 4 is a flowchart illustrating a process to perform a ROM update according to one embodiment of the invention.

FIG. 4 is a flowchart illustrating a process to perform a ROM update according to one embodiment of the invention.

Upon START, the process 400 notifies the authentication server of the ROM version in the electronic book (Block 410). Then the process 400 determines if the ROM requires an update (Block 420). If not, the process 400 is terminated. If the ROM requires an update, the authentication server responds with an "object moved" to the ROM update page (Block 430). Then the process 400 determines if the user wants the update (Block 440). If no, the process 400 is terminated. If yes, the process 400 downloads the ROM update to the electronic book (Block 450). The process 400 is then terminated.

FIG. 5 is a diagram illustrating the use of extended anchor tags to approve a sales transaction according to one embodiment of the invention.

Extended anchor tags are used to approve an order or sales transaction. The example shown in FIG. 5 illustrates the form of the extended anchor tags used an HTML document.

Optional attributes are contained in brackets, their definitions are as follows:

TYPE=secure. When the anchor is "followed", either by tap on the hot spot or status slip, a random number that has been encrypted with the electronic book secret key is appended to the target URL. This serves as an order ID. This attribute option is only recognized in a secure HTML page.

SHOWSLIP. If specified, the status slip is displayed when the page is rendered. This attribute is only recognized in a secure HTML page.

PROMPT="text". If specified, this text is rendered in the status slip. Ignored if SHOWSLIP not specified.

YESBUTTON="name". The name for the button in the status slip (default to "Yes") which if tapped by the user, follows the link specified by HREF. Ignored if SHOWSLIP not specified.

NOBUTTON="name". The name for the button in the status slip (default to "No") which if tapped by the user, follows the link specified by NOHREF. Ignored if SHOW-SLIP not specified.

NOHREF="URL". If a link for NOHREF is specified, that link will be followed if the NOBUTTON is tapped. If NOHREF is not specified, and the NOBUTTON is tapped, the slip is dismissed.

The "optional text" in an anchor that specifies SHOW-SLIP is rendered normally on the page. If the slip gets dismissed with the NOBUTTON, and no NOHREF has been specified, tapping on the "optional text" hot spot will bring the slip back down.

When the electronic book HTML parser encounters an extended anchor tag, it completes rendering the page and then immediately afterwards drops the status slip, showing an appropriate message.

Tapping "Yes" is equivalent to tapping on the anchor tag. The electronic book knows to respond with an order ID, encrypted with the current data key, inserted immediately after the "=" sign at the end of the HREF link. The order ID is a 32-bit random number generated by the electronic book.

The secure status slip shown above is modal. Tapping outside of the status slip does nothing. The status slip also can not be put away by tapping the "lock" icon.

FIG. 6 is a diagram illustrating the use of a SECURE attribute for information submission according to one embodiment of the invention.

A new SECURE attribute has been added to the <FORM tag. If this attribute is present, all form data is encrypted with the data key before being submitted to the server. Note that only the parameter data is encrypted, and not the parameter names.

The resultant URL would look something like:
. . . /register/detail.asp?Name= A672BF38D909EEC7&Date=FB117 8EEAC6748B7

Figure 7:
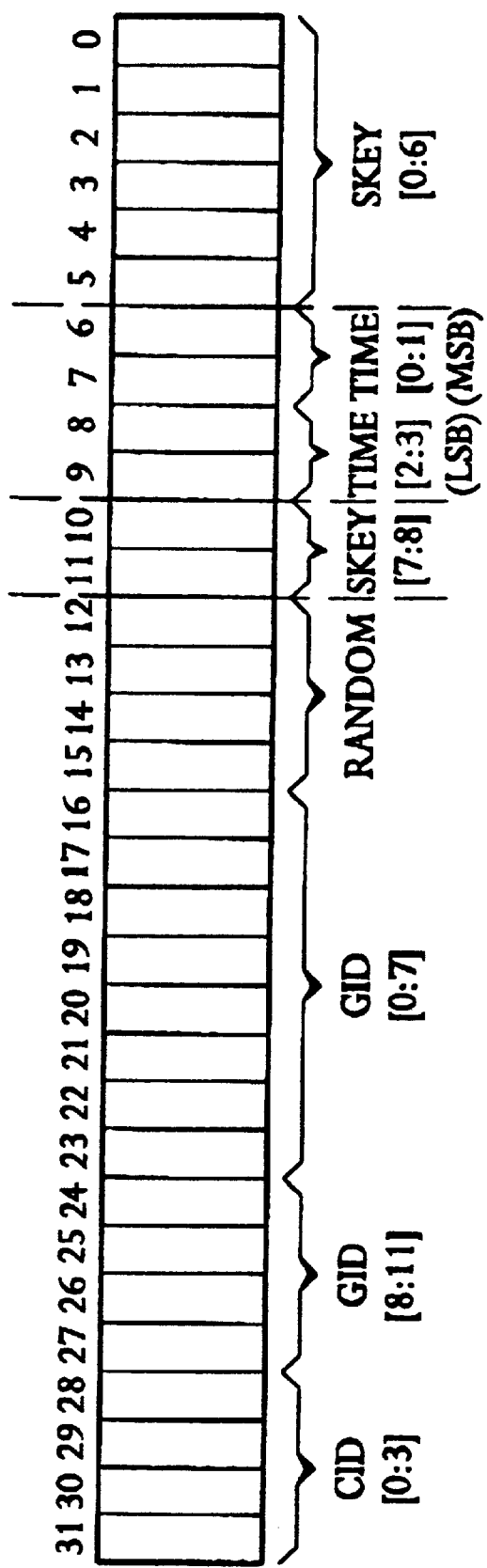
FIG. 7 is a diagram illustrating a key encryption format according to one embodiment of the invention.

FIG. 7 is a diagram illustrating a key encryption format according to one embodiment of the invention.

The encryption format includes 32 bytes and is applicable for the MESSAGE, RESPONSE, and TICKET character strings. Bytes 0–5 correspond to the session key SKEY[0:6]. Bytes 6–9 correspond to TIME[0:3] where bytes 6–7 correspond to the most significant bytes and bytes 8–9 correspond to the least significant bytes. Bytes 10–11 correspond to SKEY[7:8]. Bytes 12–15 corresponds to the random number RANDOM. Bytes 16–23 correspond to the guest ID, GID[0:7]. Bytes 24–27 correspond to the guest ID, GID [8:11]. Bytes 28–31 correspond to customer ID, CID[0:3].

The present invention provides a simple and efficient technique to authenticate an information exchange between a host and a guest on a network. The technique uses an authenticating server which shares a host key with the host and a guest key with the guest. The authentication is performed by encrypting and decrypting messages sent between two parties using the shared keys. The technique is reliable and efficient.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for authenticating an information exchange between a host and a guest on a network, the host having a host key and the guest having a guest key, the method comprising:

(a) authenticating the guest by an authenticating server, the authenticating server using the host key and the guest key;

(b) the guest authenticating the authenticating server using the guest key; and (c) the host authenticating the guest and the authenticating server using the host key.

2. The method of claim 1 further comprising:

initiating a request by the guest to the host; and redirecting the guest to connect to the authenticating server in response to the request.

3. The method of claim 1 wherein (a) authenticating the guest comprises:

the guest encrypting a message using a guest key;

the guest appending the encrypted message to a parameter list, the parameter listing including a guest identification and a device type;

the guest sending the encrypted message and the appended parameter list to the authenticating server;

the authenticating server decrypting the encrypted message to obtain a decrypted guest code; and the authenticating server authenticating the guest if the decrypted guest code matches the appended guest identification.

4. The method of claim 1 wherein (b) the guest authenticating the authenticating server comprises:

the authenticating server encrypting a response using a temporary key, the temporary key being derived from the guest key;

the guest decrypting the encrypted response to obtain a decrypted guest code using the guest key; and the guest authenticating the authenticating server if the decrypted guest code matches a guest identification.

5. The method of claim 1 wherein (c) the host authenticating the guest and the authenticating server comprises:

the guest converting a decrypted response from the authenticating server using a temporary key to an encrypted ticket;

the guest appending a guest identification to the encrypted ticket;

the host decrypting the encrypted ticket using the host key; and the host authenticating the guest and the authenticating server if the decrypted guest code matches the appended guest identification.

6. The method of claim 4 wherein the guest encrypting the message comprises:

generating a session key;

appending a time to the session key to produce a first message part;

encrypting the first message part using the guest key;

generating second message part, the second message part including a guest identification and a customer identification; and encrypting the second message part using the temporary key.

7. The method of claim 6 wherein the temporary key is created by:

generating a data key from a portion of an MD5 digest of the session key; and creating the temporary key from a portion of an MD5 of the data key.

8. The method of claim 7 wherein the authenticating server decrypting the encrypted message comprises:

obtaining a secret key according to the device type; and decrypting the encrypted message using the secret key.

9. The method of claim 8 further comprising:

the authenticating server determining if the time is within a predetermined range relative to a current time; and the authenticating server requesting the guest to re-send the message and the parameter list if the time is not within the predetermined range.

10. The method of claim 6 wherein the authenticating server encrypting the response further comprises:

encrypting the session key and the time using the host key to produce a first response part;

encrypting the guest identification and a customer identification by the temporary key to produce a second response part; and encrypting the first and second response parts using the temporary key.

11. A system for authenticating an information exchange between a host and a guest on a network, the host having a host key and the guest having a guest key, the system comprising:

an authenticating server coupled to the guest for authenticating the guest, the authenticating server using the host key and the guest key; and wherein the guest authenticating the authenticating server using the guest key and the host authenticating the guest and the authenticating server using the host key.

12. The system of claim 11 wherein the guest initiates a request to the host and the host redirects the guest to connect to the authenticating server in response to the request.

13. The system of claim 11 wherein the guest encrypts a message using a guest key;

the guest appends the encrypted message to a parameter list, the parameter listing including a guest identification and a device type;

the guest sends the encrypted message and the appended parameter list to the authenticating server;

the authenticating server decrypts the encrypted message to obtain a decrypted guest code; and the authenticating server authenticates the guest if the decrypted guest code matches the appended guest identification.

14. The system of claim 11 wherein:

the authenticating server encrypts a response using a temporary key, the temporary key being derived from the guest key;

the guest decrypts the encrypted response to obtain a decrypted guest code using the guest key; and the guest authenticates the authenticating server if the decrypted guest code matches a guest identification.

15. The system of claim 11 wherein:

the guest converts a decrypted response from the authenticating server using a temporary key to an encrypted ticket;

the guest appends a guest identification to the encrypted ticket;

the host decrypts the encrypted ticket using the host key; and the host authenticates the guest and the authenticating server if the decrypted guest code matches the appended guest identification.

16. The system of claim 14 wherein the guest generates a session key;

appends a time to the session key to produce a first message part;

encrypts the first message part using the guest key;

generates a second message part, the second message part including a guest identification and a customer identification; and encrypts the second message part using the temporary key.

17. The system of claim 16 wherein the temporary key is created from a portion of an MD5 of a data key, the data key being generated from a portion of an MD5 digest of the session key.

18. The system of claim 17 wherein the authenticating server:

obtains a secret key according to the device type; and decrypts the encrypted message using the secret key.

19. The system of claim 18 wherein the authenticating server:

determines if the time is within a predetermined range relative to a current time; and requests the guest to re-send the message and the parameter list if the time is not within the predetermined range.

20. The system of claim 16 wherein the authenticating server:

encrypts the session key and the time using the host key to produce a first response part;

encrypts the guest identification and a customer identification by the temporary key to produce a second response part; and encrypts the first and second response parts using the temporary key.

* * * * *